United States Patent [19]

Turoff

[11] 3,975,223

[45] Aug. 17, 1976

[54] TEXTURED PAINTING AND METHOD

[75] Inventor: Allan Turoff, New York, N.Y.

[73] Assignee: Erika Swimmer, New York, N.Y. ; a part interest

[22] Filed: Oct. 29, 1974

[21] Appl. No.: 518,472

[52] U.S. Cl. .................................... 156/85; 35/26; 206/223; 427/257; 427/264; 427/276

[51] Int. Cl.[2] .................... A47G 33/08; B29C 27/00

[58] Field of Search ................................ 156/58–62, 156/84–86, 246, 277, 384, 63; 35/26, 28; 117/7, 8, 111 R, 111 C, 37, 38, 41; 161/138, 36, 39, 402, 413; 264/291, 293, DIG. 71, DIG. 73; 206/223; 427/171, 172, 173, 257, 264, 270–276, 290; 428/141, 152

[56] References Cited

UNITED STATES PATENTS

| | | | |
|---|---|---|---|
| 1,560,941 | 11/1925 | Miller | 264/293 |
| 2,615,270 | 10/1952 | Adler | 156/62 |
| 2,744,349 | 5/1956 | Grossman | 35/26 |
| 2,954,615 | 10/1960 | Brown | 156/63 UX |
| 2,974,370 | 3/1961 | Baird | 264/DIG. 71 |
| 3,060,611 | 10/1962 | D'Andrea | 35/26 UX |
| 3,081,571 | 3/1963 | Dayen et al. | 156/84 |
| 3,110,554 | 11/1963 | Yazumi | 156/85 |
| 3,287,193 | 11/1966 | Klein | 156/59 |
| 3,755,062 | 8/1973 | Schirmer | 161/402 |
| 3,829,348 | 8/1974 | Spiegel et al. | 156/86 |

*Primary Examiner*—William A. Powell
*Assistant Examiner*—John E. Kittle
*Attorney, Agent, or Firm*—Amster & Rothstein

[57] ABSTRACT

An apparatus is provided for practicing the method of forming a reduced size textured painting. The painting is prepared on a polystyrene substrate which has been previously heated and stretched substantially equally in two orthogonal directions, i.e., lengthwise and widthwise. After the stretching in the presence of heat, the substrate is cooled to room temperature and retains its stretched configuration. Acrylic or oil paint is then smoothly applied and the combination of paint and substrate is heated once again after the paint has dried. The heating shrinks the substrate back to its original, pre-stretched size, with the paint shrinking at a differential rate. As a result of the differential shrinking, the previously smooth paint assumes a textured surface on the now-shrunk substrate. The miniature of the original prototype painting which is thus formed gives the appearance of a very detailed textured oil painting which can be prepared by those of even very limited artistic ability or those lacking the skill or precision to produce a miniature, textured oil painting.

3 Claims, 12 Drawing Figures

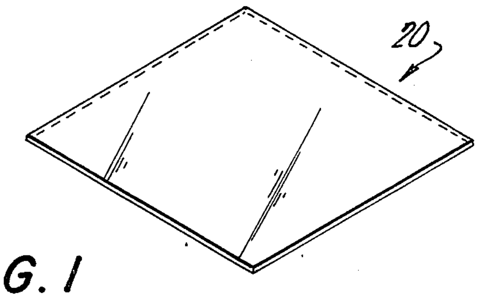
FIG. 1
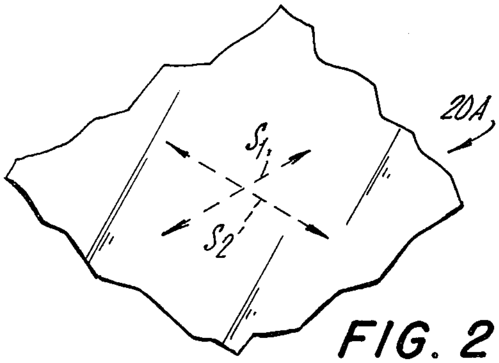
FIG. 2
FIG. 4
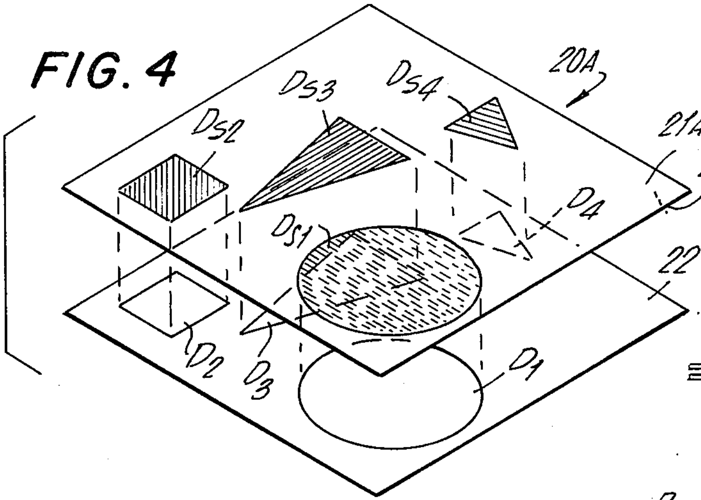
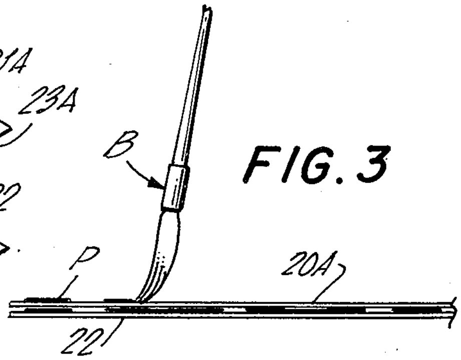
FIG. 3
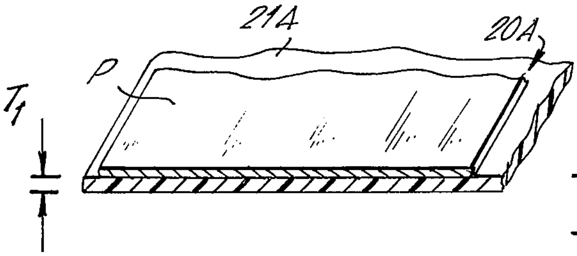
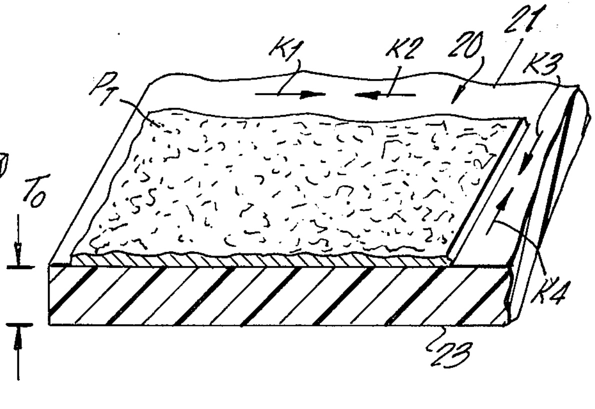
FIG. 4A
FIG. 4B
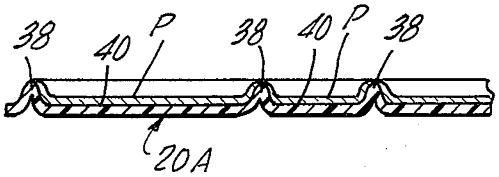
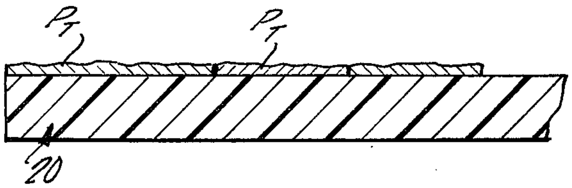
FIG. 5
FIG. 6

TEXTURED PAINTING AND METHOD

The present invention relates generally to artistic craft kits and, in particular, to a kit for use in the formation of a reduced size or miniature textured painting through the use of paint and a substrate which possess differential shrinking rates when subjected to heat.

Numerous craft kits have been available for use by both adults and children in which the final product is a painting which at least gives the appearance of being an oil painting having a textured surface. Such a finished product is desirable for display owing to the pleasing visual impact which such a finished product presents to the viewer as a result of the textured surface and collocation of colors and forms.

Various different apparatus has been made available for production of a finished product which simulates the appearance of an oil painting on a canvas substrate and which is capable of being made by those having little or no artistic skill such as the standard "paint by number" kits available.

Further, apparatus has been provided for the production of a finished painting involving collocation of various colors for use by those having only limited motor control. An example of the latter is apparatus which includes the provision of raised dams bordering areas where different colors are to be juxtaposed.

More particularly, various apparatus has been available for production of a finished painting utilizing different colors of oil paints arranged in juxtaposition to one another to form an overall pleasing design wherein tubes of oil paints of different colors are provided and numbered. The final design to be painted is outlined on the substrate and is divided into numbered areas with the numbering thereof corresponding to the numbers of the numbered tubes of oil paints supplied. The painting is produced by applying the correspondingly numbered paint to the numbered area on the substrate.

The apparatus for producing finished paintings described hereinbefore possess certain inherent disadvantages which render the finished product less than wholly desirable from an artistic standpoint.

Further, if it is desired to produce a finely detailed final product having a textured effect, an initial small size of the substrate is usually unacceptable. If the original size is too small, it prevents production of an acceptable final product by other than those possessing extreme dexterity and artistic ability.

In the so-called paint-by-number kits available, the finished product often has an amateurish final appearance owing to the lack of skill in blending colors in adjacent areas as well as the visibility in the final product of dividing lines on the original substrate used for denoting color demarcation areas.

If an initial substrate is utilized wherein dams are provided between adjacent color areas (to prevent unwanted mixture of adjacent colors), the appearance of the dams in the final product, no matter how disguised, generally provides an aesthetically unpleasing discontinuity between adjacent color areas. This discontinuity greatly detracts from the appearance of the final product and results in a finished product which could in no manner be termed professional-appearing or artistically pleasurable to the viewer.

It is an object of the present invention to provide apparatus for the practice of a method of formation of a reduced size textured painting which possesses artistic merit, fine detail, and intensified color.

It is a more particular object of the present invention to provide apparatus usable in the method of formation of a textured, reduced size, finished painting capable of use by those of little or no artistic ability which is achieved by working initially upon a substrate of enlarged size and subsequently reducing the size of the substrate.

It is a more particular object of the present invention to provide apparatus in kit form for use in the method of formation of a miniature textured final painting by utilizing a substrate of an initial size having a memory for that size, deforming said substrate substantially equally in two orthogonal directions (lengthwise and widthwise) concurrently with the application of heat thereto, painting on said deformed substrate with a paint which does not shrink under the application of heat at the same rate as does the substrate and applying heat to the combination of substrate and paint thereby causing the substrate to shrink to a size approximating its original size with the paint applied thereto "piling up" thereby imparting a textured effect thereto.

In accordance with an illustrative embodiment demonstrating objects and features of the present invention, there is provided apparatus for use in the method of producing a detailed, textured painting on a substrate. The substrate is defined as deformable from a normal configuration in at least two orthogonal directions under the application of heat thereto and being further defined as being constructed so as to retain the deformed, stretched shape upon being cooled in the deformed condition and having a memory to return to the original non-deformed non-stretched condition upon the reapplication of heat thereto. Paint is applied to the substrate in said stretched, deformed condition. The paint is characterized as differentially deforming under the application of heat thereto relative to the deformation of said stretched substrate to said normal configuration thereby forming a textured surface on the substrate upon the application of heat to the substrate.

Further, in accordance with an illustrative embodiment demonstrating objects and features of the present invention, there is provided a method for formation of a reduced size textured painting which comprises the procedural combination of steps of providing a substrate of a given original, normal size having a memory for the normal size and being deformable under the action of tensile stresses applied thereto in the presence of heat and being further defined as being able to retain the deformed size upon removal of the tensile stresses and removal of the source of heat. Applying heat to the substrate and applying substantially equal, orthogonally directed (lengthwise and widthwise) tensile forces to the heated substrate thereby deforms the heated substrate in two orthogonal directions in the plane of the substrate. Removing the source of heat and removing the tensile forces, the substrate thereby remains in a stretched condition. Paint is applied to the stretched substrate. A paint is used which does not shrink at the same rate as does the substrate upon the application of heat thereto. Heating the substrate including the paint thereon without the application of tensile forces to the substrate causes the substrate to shrink to substantially the original, normal size and the paint thereon to form a textured surface on the surface of the normal size substrate.

The above brief description, as well as further objects, features and advantages of the present invention, will be more fully understood by reference to the following detailed description of the presently preferred but nonetheless illustrative embodiment in accordance with the present invention, when taken in conjunction with the accompanying drawing, wherein:

FIG. 1 is a perspective view of a substrate usable with the present invention shown in its normal configuration prior to paint being applied thereto;

FIG. 2 is a fragmentary perspective view of the substrate of FIG. 1 after the same has been heated and stretched in two orthogonal directions;

FIG. 3 is a fragmentary elevational view of the stretched substrate of FIG. 2 shown in position over a prototype with a paint being applied to the front, exposed surface of the substrate;

FIG. 4 is an exploded perspective view, on a reduced scale, of the substrate and prototype of FIG. 3 showing the correspondence between the substrate bearing the paint and the pattern on the prototype;

FIG. 4A is an enlarged fragmentary perspective view of the substrate including the paint thereon prior to reheating thereof;

FIG. 4B is an enlarged fragmentary perspective view of the substrate including the paint thereon subsequent to reheating thereof;

FIG. 5 is a sectional elevational view on an enlarged scale of an alternate embodiment of the present invention showing raised dams between adjacent color areas subsequent to the application of paint thereto;

FIG. 6 is a sectional elevational view similar to FIG. 5 shown subsequent to reheating of the substrate and paint combination;

Figure 7:
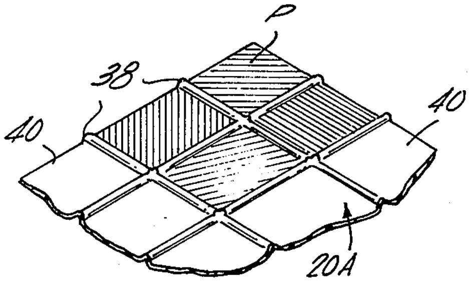
FIG. 7 is a perspective view of the alternate embodiment of FIG. 5 shown prior to reheating of the substrate and paint combination.

Referring now specifically to the drawing and first to FIG. 1, there is shown an illustrative substrate for use in the present invention and embodying features of the present invention, generally designated by the reference numeral 20. In the preferred form of the present invention, the substrate 20 shown in FIG. 1 is shown in its "normal" or undeformed condition.

The substrate 20 may be formed of any suitable transparent or opaque substance which possesses the characteristic of being deformable from its normal unstretched configuration in at least two orthogonal directions within the plane of the substrate under the application of heat and tensile forces thereto to a stretched, deformed configuration. The substrate 20 must also possess the characteristic of retaining the deformed, stretched configuration once the tensile stresses and heat are removed.

The substrate 20 must further be possessed of the characteristic of having a memory for its original, undeformed or normal shape and be able to return substantially to that undeformed or normal shape upon the reapplication of heat thereto without the application of either tensile or holding forces in the orthogonal directions, and of shrinking substantially equally in the orthogonal directions to reassume the original, undeformed or normal shape and size.

While any material possessing the above-described characteristics may serve as the substrate in the present invention, in the preferred embodiment biaxially oriented polystyrene is known to be deformable from 150% to approximately 250% of an increase over its normal length and width dimensions under the application of heat and orthogonally directed tensile forces thereto. Such biaxially oriented polystyrene is readily available in certain craft kits wherein a design is affixed thereto in the stretched configuration by the use of, for example, a marking pen or the like. The substrate and pen combination is subsequently heated to shrink the same to form a miniature design and thereby minimize errors in the original design applied to the stretched substrate.

Such available craft kits do not permit the formation of a miniaturized textured design, nor do they possess the outstanding additional features and characteristics of the present invention to be described in more detail hereinafter.

In order to be usable in the craft kit of the present invention, the substrate 20 supplied in the kit had been formed, for example, by being heated to a temperature within the range of approximately 200° to 200° Fahrenheit by any conventional method such as being placed in an appropriate oven. While heated, the substrate 20 had been stretched biaxially in two orthogonal directions (lengthwise and widthwise) by appropriate apparatus which applied tension thereto in the directions indicated by the directional arrows S1, S2 in FIG. 2. The substrate 20 had simultaneously increased in length and width while decreasing in thickness.

The thus-stretched substrate 20 had been removed from the source of heat and allowed to cool while the biaxial stretching means maintained the stretching tension and stretched configuration of the substrate. The substrate which results retains its increased length and width and decreased thickness and is generally designated by the reference numeral 20A.

The surface of the substrate 20A to which paint is to be applied can either be smooth or it can be roughened to aid in adherence of the paint to the surface. The surface of the substrate may either be pre-roughened when the pre-stretched substrate 20A is supplied or may be smooth, with instructions being given to the user of the kit to roughen the surface by the use of appropriate abrading means such as steel wool or fine sandpaper.

In a preferred embodiment, the substrate 20A which is supplied with the kit is transparent or, at the very least, translucent. Consequently, a prototype 22 may be supplied bearing various design elements $D_1$, $D_2$, $D_3$ and $D_4$ thereon for copying by a user of the kit.

The design elements $D_1$, $D_2$, $D_3$, $D_4$ illustrated are shown as simple geometric shapes for ease of representation. However, the actual design elements $D_1$, $D_2$, $D_3$ and $D_4$ may be in any desired shape or may represent desired persons, objects, or the like. Alternately, if it is desired to form a miniature oil painting of the likeness of a particular person, a photograph of that person may serve as the prototype.

To begin production of the desired finished painting, the substrate 20A is placed so as to overlie with the rear surface 23A thereof in contact with the prototype 22. A paint brush B, which may or may not be supplied with the kit, is used to apply paint P to the front, exposed surface 21A of the substrate 20A to form on the surface thereof reproductions of the design elements $D_1$, $D_2$, $D_3$ and $D_4$ (see FIG. 4).

The paint P which is used may be any paint which flows, applies smoothly to cover completely, and which adheres to the front surface 21A of the substrate 20A. An additional characteristic of the paint P which is required is that upon shrinking of the substrate 20A to its normal configuration, as described more fully hereinafter, the paint P must not shrink at the same rate as the substrate 20A. It is, of course, not necessary for the paint P to shrink at all upon the application of heat to the combination of the paint and substrate. However, it is required that the paint P and the substrate 20A shrink differentially relative to one another. In the preferred embodiment, the paint P may be one of the many acrylic paints available. Alternately, the paint P may be an enamel or any other suitable paint so long as it satisfies the criteria discussed hereinbefore.

As may be seen by reference to either FIGS. 3 or 4, if the substrate 20A is transparent or translucent, the paint P is applied to the front surface 21A thereof in a manner to as closely as possible approximate or copy thereon the design elements $D_1$, $D_2$, $D_3$, $D_4$ of the prototype 22.

When the paint P has been applied to selected locations on the front surface 21A of the substrate 20A, it assumes an appearance thereon which is generally smooth and even as may be seen by reference to FIG. 4A. Such smooth, even coverage is desirable as a user of the present invention need not concern himself or herself with subtleties of texturing and, instead, may concentrate solely on even coverage of the selected location sought to be colored.

Upon application of the paint P to all desired selected locations on the front surface 21A of the substrate 20A, the substrate and paint combination is placed in a source of heat at approximately 200° Fahrenheit such as an oven or the like. The temperature of the oven is increased by increments of approximately 25° Fahrenheit every 10 minutes. The substrate and paint combination remains in the oven a total of approximately one half hour with the amount of time varying with the thickness of the substrate and the thickness of the paint applied thereto.

Under the action of the heat, the substrate 20A shrinks in the direction of the directional arrows K1, K2, K3 and K4 (see FIG. 4B) returning to its original or normal size. Simultaneously, the thickness of the substrate 20 in the stretched configuration, designated by the reference letter $T_1$ (see FIG. 4A) returns to its original thickness as illustrated by the reference letter $T_0$ (see FIG. 4B).

Simultaneously with the shrinking of the substrate 20A back to its original or normal size or configuration, the paint $P_T$ has shrunk at a different rate (or, alternately, has not shrunk at all) and has assumed a textured surface on the top surface 21 of the substrate 20 as may be seen by reference to FIG. 4B. The combination is then removed from the heat and cooled to "room" temperature which may be from 60° to 90° Fahrenheit.

Figure 9:
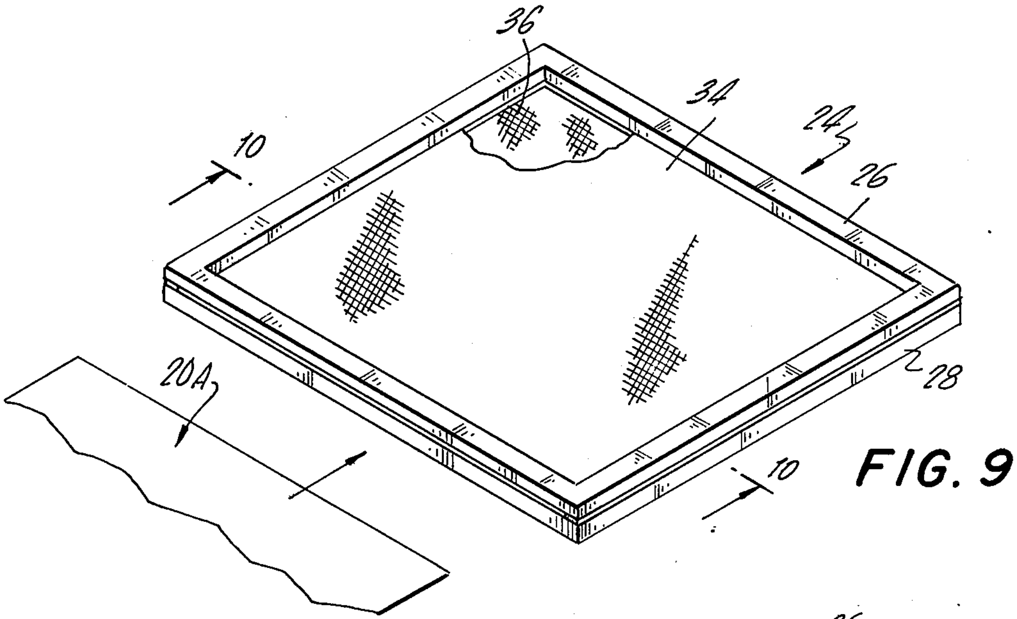
FIG. 9 is a fragmentary perspective view of a frame, with parts broken away, showing a painted substrate about to be inserted therein for use in reheating the painted substrate; and, FIG. 10 is a sectional elevational view taken substantially along the line 10—10 of FIG. 9 and looking in the direction of the arrows.
Figure 10:
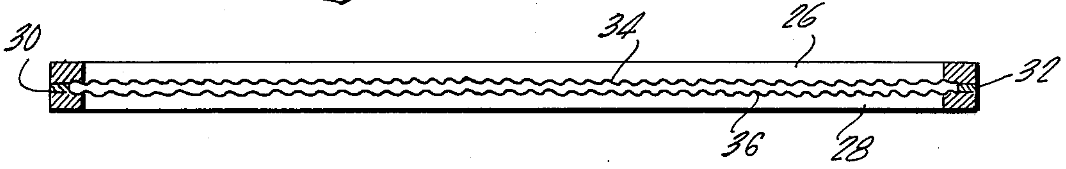

Under certain circumstances, the substrate 20A with the paint P thereon may exhibit a tendency to curl back upon itself under the application of heat thereto. In order to prevent this curling while heated, a frame, generally designated by the reference numeral 24 may be provided, which includes upper and lower frame members 26, 28 separated by spacers 30, 32 (see FIGS. 9 and 10).

The upper and lower frame members 26, 28 include fixed therebetween anti-curl restraining members 34, 36 respectively. The anti-curl restraining members 34, 36 may be fashioned of any suitable material which will not adhere to the substrate 20A or the paint P during the heating process. In a preferred embodiment, commercially available hardware cloth may be used.

In use, the substrate 20A, including the paint P on the front or top surface 21A thereof, is inserted between the upper and lower anti-curl restraining members 34, 36 in the frame 24. The frame 24 is then inserted within the oven and heated for the required amount of time. Naturally, the upper and lower frame members 26, 28 must be fashioned of material which will not ignite at the temperatures to which the oven must be raised in order to reshrink the substrate 20A in its stretched configuration back to its original or normal size.

In an alternate embodiment of the present invention, the substrate 20A may be provided with a plurality of dams or ridges 38 (see FIGS. 5 and 7) for use in containing the paint P within designated wells or cavities 40 formed therebetween on the front surface 21A of the substrate 20A.

The ridges 38 may be formed during the initial heating process described hereinabove by heating and stretching the original substrate 20 over a form (not shown) which includes raised projections thereon. The ridges 38 may be in a specific predetermined pattern which outlines the different color areas of the final painting to be fashioned. The substrate 20A including the ridges 38 formed therein may be placed over a prototype similar to the prototype 22 or may contain numbers thereon corresponding to the numbers of supplied acrylic or other suitable paint.

After applying the paint P to the cavities 40 defined between adjacent ridges 38, the combination of the substrate 20A and the paint P is heated as described hereinabove. Upon being heated, the substrate 20A reduces in length and width and shrinks to its original or normal size. Due to differential shrinking rate between the substrate 20A and the paint P, the paint P "piles up" on the front surface 21A and forms a textured surface $P_T$ thereon (see FIGS. 6 and 8).

Figure 8:
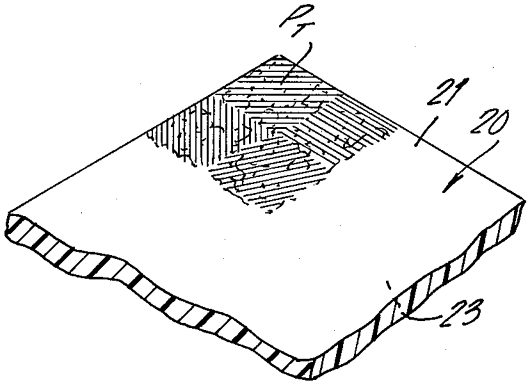
FIG. 8 is a fragmentary perspective view of the alternate embodiment of FIG. 6 shown subsequent to reheating of the paint and substrate combination.

As may be noted by reference to FIGS. 6 and 8, when the alternate embodiment including the ridges 38 is heated, the substrate 20A returns to its normal size with plane surfaces 21 and 23 and the ridges 38 effectively disappear. The result is a textured surface painting without unsightly, amateur-appearing, raised separation lines between adjacent colored areas.

The described apparatus is usable in the method of producing a miniaturized, highly detailed painting, having a textured surface. The apparatus is usable by one of limited motor control, such as a child, and is a significant advance over previously available kits.

Virtually without exception, when those of limited artistic ability or those having difficulty in motor control previously attempted to produce paintings by the use of a substrate which included raised ridges between adjacent color areas, the paint had to be applied from the rear surface of the substrate in order that the dams would not be visible from the front or viewing side thereby detracting from the overall appearance of the finished item. Naturally, such an arrangement rendered it impossible to produce a finished product which exhibited a textured effect simulating an actual oil painting as any texture of the paint would be lost to view.

Use of the apparatus and method of the present invention, by virtue of the nature of formation of the ridges 38 and the "memory" of the substrate 20 to return to its normal configuration, permits production of a textured surface painting of reduced size by even those of limited motor control without undesirable mixture of adjacent colors and without the finished product including unsightly ridges between adjacent color areas which would detract from the overall appearance and effect of the finished painting.

If it is desired to enhance the amount of texture or prominence supplied to a specific selected area or areas on the surface of the substrate 20A, an initial coat of paint P can be applied to the area or areas and allowed to dry. A second coat may then be applied on top of the first coat and also allowed to dry. If desired, still a third coat can be applied on top of the dry second coat.

When the substrate 20A, including the several layers of paint on the selected area or areas, is placed in the oven for shrinking as described hereinbefore, the paint which has been applied in several layers on specific areas will increase the textured effect of those selected areas and will be raised above the surrounding single-layer-painted areas. There is thus provided an additional measure of artistic variation which may be used for the expression of the individuality of the particular user of the apparatus and method of the present invention.

As one of the many variations possible with the present invention, the substrate 20 may be provided as initially opaque. With an opaqued substrate, outlines may be provided on the front surface thereof including numbers contained therein. The user may be supplied with correspondingly numbered paints for use in the normal paint-by-number manner. However, by virtue of the unique texturing effect and differential shrinking rate between the paint P and the substrate 20A available with the apparatus and method of the present invention, the normal discontinuities which exist between adjacent painted areas and the possibility of lack of complete coverage of the underlying numbers and lines is eliminated. What results when the substrate shrinks is a reduction in size with attendant enhancement of vividness of colors and a finished product is produced which appears professional and is artistically pleasing.

Another variation of the apparatus and method of the present invention involves utilization of a transparent or at least translucent substrate 20A which would be placed over a photograph or other picture which could be copied or traced onto the surface of the substrate 20A. After heating in an oven as described hereinbefore, the painting which results is a miniature, colored, textured, reproduction of the photograph or picture which was copied.

As further alternate embodiments, in forming the substrate 20A the original substrate 20 may be stretched unequally in two orthogonal directions, may be stretched equally in two non-orthogonal directions, or may be stretched in only one direction.

The result of using a substrate 20A stretched in the manner discussed immediately above is a substrate which shrinks unequally, thereby producing artistic and interesting variations in the finished product after heating.

As will be readily apparent to those skilled in the art, the invention may be used in other forms without departing from its spirit or essential characteristics. The present embodiments are, therefore, to be considered as illustrative and not restrictive, the scope of the invention being indicated by the claims rather than by the foregoing description, and all changes which come within the meaning and range of equivalents of the claims are therefore intended to be embraced therein.

What is claimed is:

1. A method for simulating oil painting having a textured surface comprising providing a polystyrene substrate having a front surface and a rear surface of a normal configuration having a given length and width, said normal configuration having been altered with said given length and width of said substrate having been increased from 150% to 250% thereby forming a substrate of stretched configuration, applying acrylic paint smoothly to selected locations on the front surface of said stretched configuration substrate, allowing said paint to dry, heating said stretched configuration substrate including said paint thereon to within a range of from 200° to 300° Fahrenheit thereby causing said substrate length and width to shrink to said normal configuration and also causing said smoothly applied paint to form a textured surface on the front surface of said substrate, cooling said substrate and paint to within the range of 60° to 90° Fahrenheit.

2. The method according to claim 1 including abrading the front surface of said polystyrene substrate in said stretched configuration prior to applying said acrylic paint thereto.

3. The method according to claim 1 including providing a frame having a length and width at least equal to the length and width of said stretched configuration substrate and including means fixed to said frame for preventing curling of said stretched configuration substrate upon heating thereof, inserting said painted stretched configuration substrate within said frame prior to heating thereof.

* * * * *